United States Patent
Chang (10) Patent No.: US 9,191,920 B2
(45) Date of Patent: Nov. 17, 2015

(54) MULTIMEDIA BROADCAST MULTICAST SERVICE (MBMS) IDLE MODE COUNTING PROCEDURE

(75) Inventor: Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 908 days.

(21) Appl. No.: 13/285,934

(22) Filed: Oct. 31, 2011

(65) Prior Publication Data

US 2013/0107784 A1    May 2, 2013

(51) Int. Cl.
H04L 12/28 (2006.01)
H04W 72/00 (2009.01)
H04J 1/16 (2006.01)

(52) U.S. Cl.
CPC .................. H04W 72/005 (2013.01)

(58) Field of Classification Search
CPC ..... H04W 4/06; H04W 72/005; H04L 12/189
USPC .................. 370/252, 278, 329, 487
See application file for complete search history.

(56) References Cited

U.S. PATENT DOCUMENTS

| | | | |
|---|---|---|---|
| 7,400,593 B2 * | 7/2008 | Choi et al. | 370/310 |
| 2004/0157640 A1 | 8/2004 | Pirskanen et al. | |
| 2006/0035645 A1 * | 2/2006 | Kim | 455/452.1 |
| 2007/0206530 A1 * | 9/2007 | Lee et al. | 370/329 |
| 2008/0014925 A1 | 1/2008 | Van Lieshout et al. | |
| 2008/0311926 A1 | 12/2008 | Fischer et al. | |
| 2013/0064167 A1 * | 3/2013 | Worrall | 370/312 |

FOREIGN PATENT DOCUMENTS

| | | |
|---|---|---|
| EP | 1986376 A1 | 10/2008 |
| WO | 2008024214 A2 | 2/2008 |
| WO | 2011050996 A1 | 5/2011 |

OTHER PUBLICATIONS

Ericsson et al: "Counting for MBMS Rel-10", 3GPP Draft; R2-103865 Counting for MBMS REL-10, 3rd Generation Partnership Project (3GPP), Mobile Competence Cengre; France, vol. RAN WG2, no. Stockholm, Sweden; Jun. 28, 2010, Jun. 22, 2010.
Vodafone Group: "Mechanisms for counting and re-counting MBMS users in idle/URA PCH-Like states", 3GPP Draft; R2-030063 MBMS Counting Recounting, 3rd Generation Partnership Project (3GPP), Mobile Competence Centere; France, vol. RAN WG2, no. UK; Jan. 13, 2003.

(Continued)

Primary Examiner — John Pezzlo (57) ABSTRACT

An idle mode counting procedure for Multimedia Broadcast Multicast Service (MBMS) systems operating in accordance with a 3rd Generation Partnership Project (3GPP) Long Term Evolution (LTE) communication specification includes sending an idle mode downlink message with an idle mode counting request identifying a PTM compatible service. The idle mode downlink message can be received by wireless communication devices in idle mode and includes an idle mode counting request identifying a PTM compatible service. Idle mode counting request response messages are received from wireless communication devices where the idle mode counting request response messages are transmitted by wireless communication devices that were in the idle mode at the time the downlink message was sent. Each idle mode counting request response message indicates that the communication device sending the idle mode counting request response message should be counted for the PTM compatible service.

7 Claims, 5 Drawing Sheets

(56) References Cited

OTHER PUBLICATIONS

Catr, "Two-Stages Method to Count RRC_IDLE UE", 3GPP TSG-RAN WG2 Meeting #71, R2-104754, Aug. 2010, URL: http://www.3gpp.org/ftp/tsg_ran/wg2_rl2/TSGR2_71/Docs/R2-104754.zip.

IPWireless Inc., "Layer 1 Signalling Based Counting Method for E-MBMS", 3GPP TSG RAN WG2 #71, R2-104531, Aug. 2010, URL: http://www.3gpp.org/ftp/tsg_ran/wg2_rl2/TSGR2_71/Docs/R2-104531.zip.

Office Action mailed on Aug. 18, 2015 by Japanese Patent Office and issued for Japanese Patent Application No. 2014-539141.

* cited by examiner

MULTIMEDIA BROADCAST MULTICAST SERVICE (MBMS) IDLE MODE COUNTING PROCEDURE

CROSS REFERENCE TO RELATED APPLICATIONS

This application is related to patent application Ser. No. 13/285,901, entitled MULTIMEDIA BROADCAST MULTICAST SERVICE (MBMS) COUNTING PROCEDURES, and filed concurrently with this application and incorporated in its entirety herein.

FIELD

This invention generally relates to wireless communications and more particularly to Multimedia Broadcast Multicast Service (MBMS) counting procedures.

BACKGROUND

Multimedia Broadcast Multicast Service (MBMS) is a Point-to-Multipoint (PTM) interface specification designed to provide efficient delivery of broadcast and multicast services within 3rd Generation Partnership Project (3GPP) cellular networks. Examples of MBMS interface specifications include those described in Universal Mobile Telecommunications System (UMTS) and Long Term Evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside an MBSFN (Multimedia Broadcast multicast service Single Frequency Network) area transmit the same MBMS service.

Users access these services and obtain the MBMS content through wireless communication devices such as cellular phones, tablets, laptops, and other devices with wireless transceivers that communicate with the base stations within the communication system. The base stations, sometimes referred to as eNodeBs or eNBs, provide wireless services to the wireless communication devices, sometimes referred to as user equipment (UE), within cells.

The wireless communication devices (UEs) may be in one of at least two modes including a connected mode and an idle mode. A UE is in Connected Mode when an RRC (Radio Resource Control) connection has been established. If no RRC connection is established, the UE is in the idle mode. Therefore, the connected mode comprises an established Radio Resource Control (RRC) Connection while there is no established RRC Connection in the idle mode.

When in the Connected Mode, the UE performs functions such as 1) monitoring a Paging channel and/or System Information Block Type 1 contents to detect system information change, for ETWS capable UEs, ETWS notification, and for MBMS capable UEs, CMAS notification; 2) monitoring control channels associated with the shared data channel to determine if data is scheduled for the UE; 3) providing channel quality and feedback information; 4) performing neighboring cell measurements and measurement reporting; 5) Acquiring system information; and 6) receiving MBMS services via MBSFN.

Communication between the UE and an eNodeB is more limited in the idle mode. In idle mode, the UE receives signals from a selected eNodeB including system information. The UE performs cell measurements to select and reselect cells (eNodeBs). The UE controls its own mobility between cells. In other words, handovers from cell to cell are performed by the UE and not directed by the network. The UE switches from idle mode to Connected Mode by establishing an RRC connection which is performed by first accessing the network on a control channel of the cell from which the UE is receiving information. In most situations, the network is aware of a set of tracking areas where the UE is located. When the network receives a call for the registered UE, the network sends a "paging" message for the particular UE on the control channels of all the cells in the set of tracking areas associated with the UE. The UE receives the paging message because it is tuned to the control channel of a cell in one of the registered tracking areas. The UE can respond on that control channel. In the idle mode, the UE receives emergency notifications such as Earthquake and Tsunami Warning System (ETWS) and Commercial Mobile Alert System (CMAS) notifications. As in the connected mode, the UE can receive MBMS service via MBSFN in the idle mode.

A user can access at least some multimedia services through a UE using either a Point-to-Point (PTP) connection or a Point-to-Multipoint (PTM) transmission. PTP services are provided using Unicast techniques and PTP transmissions are performed using MBMS communication in 3GPP systems. Accordingly, a PTM compatible service can be provided using either Unicast service or MBMS. In order to avoid inefficient use of resources, current specifications and proposals include provisions for tracking and evaluating the number of UEs in connected mode that have been characterized by the network, at least for resource management purposes, as UEs that will receive the PTM compatible service.

SUMMARY

An idle mode counting procedure for Multimedia Broadcast Multicast Service (MBMS) systems operating in accordance with a 3rd Generation Partnership Project (3GPP) Long Term Evolution (LTE) communication specification includes sending an idle mode downlink message with an idle mode counting request identifying a PTM compatible service. Wireless communication devices in the system are capable of being in one of at least two modes including a connected mode and an idle mode where a wireless communication device is in the connected mode when an RRC (Radio Resource Control) Connection has been established and is in the idle mode when no RRC connection has been established. The idle mode downlink message can be received by wireless communication devices in idle mode and includes an idle mode counting request identifying a PTM compatible service. The idle mode downlink message can be a System Information Block (SIB) message or a MBMS point-to-multipoint Control Channel (MCCH) message. Idle mode counting request response messages are received from wireless communication devices where the idle mode counting request response messages are transmitted by wireless communication devices that were in the idle mode at the time the downlink message was sent. Each idle mode counting request response message indicates that the communication device sending the idle mode counting request response message should be counted for the PTM compatible service.

DETAILED DESCRIPTION

As described above, current specifications and proposals include techniques for counting the number of wireless communication devices (UEs) in connected mode that are receiving a specific PTM compatible service over MBMS. As discussed herein, a PTM compatible service is any combination of data, communication, service, and content that can be provided by PTM techniques. In most situations, the PTM compatible service can also be provided by Unicast service using PTP techniques. Resources are more efficiently allocated, however, by only providing the specific PTM compatible service with MBMS when the number of wireless communication devices in connected mode (connected mode UEs) receiving the specific PTM compatible service using PTM is sufficiently high. For example, if there are many users that are using, or will likely use, a particular PTM compatible service in the MBSFN area, then the network allocates resources to deliver the program by MBMS via PTM. In other words, if there are many users that are interested in getting a particular PTM compatible service and, therefore, are operating a wireless communication device that is receiving, or is likely to receive, the PTM compatible service in the MBSFN area, then the network allocates resources to deliver the specific PTM compatible service using PTM techniques. On the contrary, if there are a small number of users that are interested in and will use the particular PTM compatible service, it is more efficient to deliver the PTM compatible service using PTP techniques such as those used with a Unicast connection Stated differently, if the number of devices that are receiving or are likely to receive specific PTM compatible service is below some threshold, it is more efficient to provide the specific PTM compatible service using PTP with a Unicast connection. When services are broadcasted by PTM using MBMS, all cells inside the MBSFN (Multimedia Broadcast multicast service Single Frequency Network) area are required to broadcast the same information so the amount of wasted resource could be very large when very few wireless communication devices (UEs) are obtaining the service. In accordance with current specifications, therefore, a program or service is discontinued from PTM transmission when the size of the audience using wireless communication devices in connected mode decreases below a threshold. For activation of a service by PTM, the network evaluates the number of wireless communication devices which are PTM capable but which are receiving a given PTM compatible service via PTP such as through a Unicast service as well as devices that have been identified as devices that are will receive the PTM compatible service. The network characterizes devices that are receiving the service or that are likely to receive the service as devices that will receive the service for purposes of resource management and determines the number of PTM capable wireless communication devices (UEs) that are characterized as devices that will receive the service. When that number of PTM capable wireless communication devices (UEs) exceeds a threshold, the service is provided using PTM.

In order for the network to receive reception status feedback from the wireless communication devices (UEs), the current 3GPP specifications specify Counting Procedures. A Counting Procedure is initiated by the network. A Multi-cell/multicast Coordination Entity (MCE) in the network sends a request to each eNodeB providing the specific PTM compatible service in the MBSFN area to send a Counting Request to the wireless communication devices (UEs). The Counting Request contains a list of specific PTM compatible service identifiers requiring wireless communication device (UE) feedback. The connected mode wireless communication devices (UEs) which are receiving, or interested in receiving, the identified content respond with a Counting Response message including the specific PTM compatible service identifiers that are of interest.

The current communication specifications, therefore, provide for a Counting Procedure that allows for the network to determine a number of wireless communication devices (UEs) in the connected mode that are interested in specific MBMS content. Unfortunately, the current specification and proposals do not account for wireless communication devices (UEs) in idle mode that are receiving, or will likely receive, a specific PTM compatible service. Such an arrangement results in an inefficient use of resources in some circumstances.

For example, conventional systems, specifications, and proposals may discontinue or refrain from providing PTM compatible services using PTM if the number of communication devices in connected mode that are receiving or would receive the PTM compatible service is less than the minimum required to justify providing the PTM compatible service using PTM. Wireless communication devices (UEs) in idle mode that are receiving or would receive the PTM compatible service will be required to switch to a PTP (Unicast) connection in order to receive the PTM compatible service. This results in an inefficient use of resources when the number of such wireless communication devices (UEs) is above some threshold. Additional communication resources are unnecessarily dedicated to maintain multiple PTP (Unicast) sessions. Also, since the wireless communication devices (UEs) must be in the connected mode for PTP (Unicast) services, the wireless communication devices (UEs) consume more power resulting in decreased battery life of the wireless communication devices (UEs).

In accordance with the examples herein, the wireless communication devices (UEs) in idle mode that are receiving or will likely receive the PTM compatible service are counted. In one example, the idle mode wireless communication devices (IM wireless communication devices, idle mode UEs, IMUEs) are only counted if the counted number of the connected mode wireless communication devices (CM wireless communication devices, connected mode UEs, CMUEs) does not justify providing the PTM compatible service via PTM.

Figure 1:
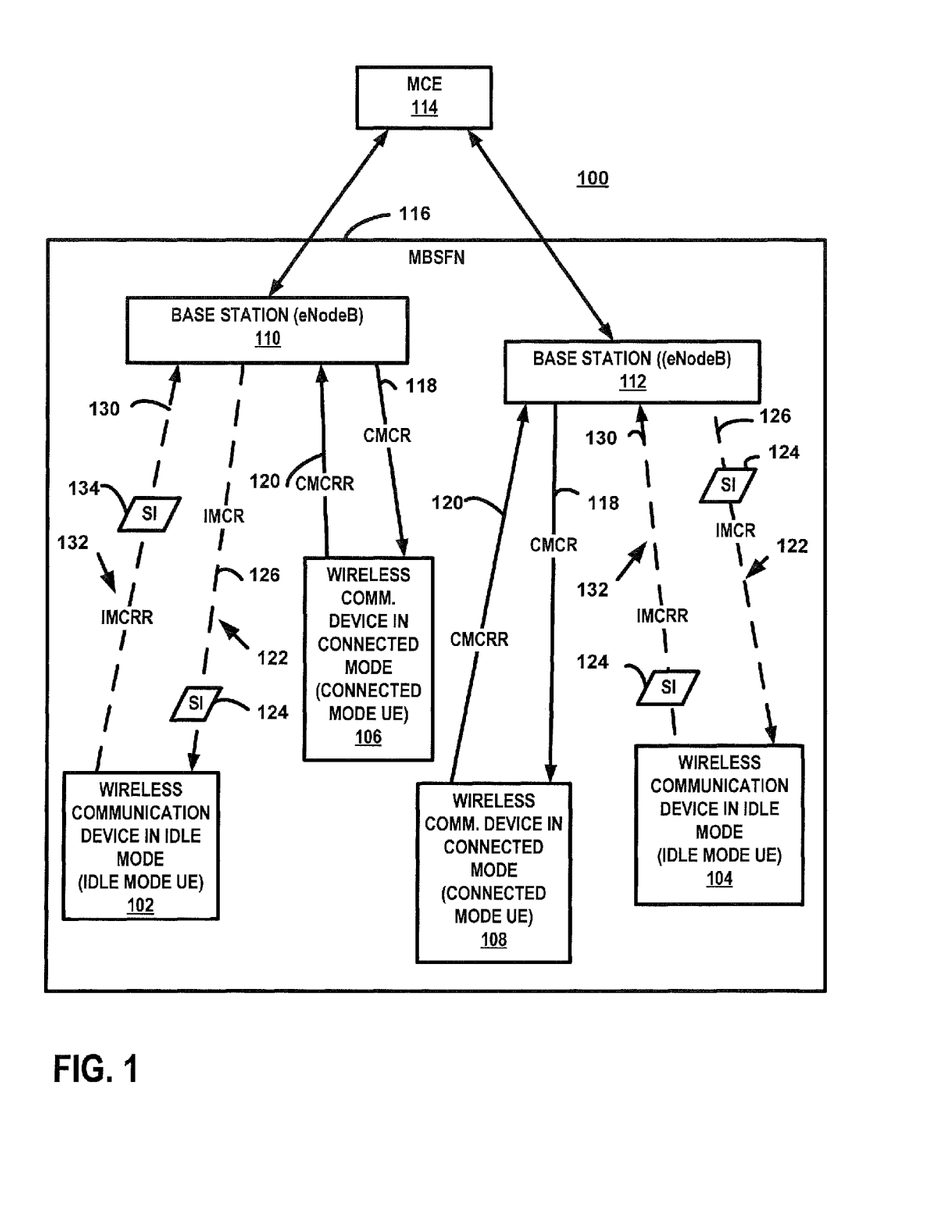
FIG. 1 is a block diagram of a communication system that is capable of providing Multimedia Broadcast Multicast Service (MBMS) to communication devices.

FIG. 1 is a block diagram of a communication system 100 that is capable of providing Multimedia Broadcast Multicast Service (MBMS) to wireless communication devices 102, 104, 106, 108. The communication system 100, therefore, is referred to as a MBMS communication system 100. The MBMS communication system 100 is capable of transmitting certain content to wireless communication devices (UEs) using either Unicast services or the MBMS services. The content, referred to herein as PTM compatible service, may be a service, data, or a program that can be accessed through a wireless communication device. Examples of PTM compatible services include streaming audio and video and other multimedia data. Accordingly, as discussed herein, a PTM compatible service may be provided using PTP (Unicast) service or PTM service. The communication system 100 may also provide other communication services such as wireless telephone service, SMS, text messaging, and others services.

The MBMS communication system 100 includes several base stations 110, 112 sometimes referred to as eNodeBs or eNBs (110, 112), that communicate with the wireless communication devices (UEs) 102, 104, 106, 108 by transmitting downlink signals and receiving uplink signals transmitted from the wireless communication devices 012, 104, 106, 108. The wireless communication devices (UEs) 102, 104, 106, 108 are any wireless communication devices such as mobile phones, transceiver modems, personal digital assistants (PDAs), and tablets, for example. The wireless communication devices may be referred to as cell phones, mobile devices, smart phones, and other names. In systems operating in accordance with 3rd Generation Partnership Project (3GPP) communication standards, the wireless communication devices 102, 104, 106, 108 are often referred to as user equipment (UE), (UEs), or UE devices. Since for the examples provided herein the system operates in accordance with a 3GPP communication specification, the term eNodeB may be used to refer to the base stations and the wireless communication devices may be referred to as UEs.

The base stations (eNodeBs) 110, 112 are connected to a network through a backhaul in accordance with known techniques. The MBMS communication system 100 provides PTM services by transmitting the PTM compatible service through multiple base stations (eNodeBs) 110, 112 using PTM and MBMS techniques.

A Multi-cell/multicast Coordination Entity (MCE) 114 manages MBMS communications by exchanging information and instructions with the base stations (eNodeBs) 110, 112. The MCE 114 is typically a logical entity that is implemented over several devices or network elements within the network/system. The MCE 114, however, may be implemented within a single device or network element in some circumstances. The MCE 114 performs functions such as admission control and allocation of radio resources for the MBMS Single Frequency Network (MBSFN) area 116 for multicell MBMS. In managing the MBMS communications, the MCE 114 invokes counting procedures and acquires counting results for one or more PTM compatible services. Based on the counting procedure results and possibly other factors, the MCE 114 determines whether a PTM session should be suspended, established, and resumed. A MBMS session is a session where a PTM compatible service is multicast from the eNodeBs 110, 112. Other than the new counting procedures described herein, the MCE 114 operates in accordance with one or more current 3GPP specifications to perform these tasks for the examples described herein.

As discussed above, the wireless communication devices (UEs) may be in one of at least two modes including an idle mode and a connected mode. When operating in accordance with a 3GPP communication specification, operations are defined for at least an idle mode and a connected mode. For the example of FIG. 1, two of the wireless communication devices (UEs) 102, 104 are in idle mode and are referred to as idle mode wireless communication devices and idle mode UEs 102, 104. The wireless communication devices (UEs) also include wireless communication devices (UEs) that are in connected mode that are referred to as connected mode wireless communication devices and connected mode UEs 106, 108. Connected mode wireless communication devices (UEs) differ from idle mode wireless communication devices (UEs) in at least that the connected mode wireless communication devices (UEs) have an established RRC connection as defined by the particular 3GPP specification governing operation of the system 100 and idle mode wireless communication devices (UEs) do not have an RRC connection. Accordingly, idle mode UEs lack an RRC connection with an eNodeB (base station).

The MBMS system 100 counts idle mode communication devices (idle mode UEs) in certain circumstances. When a count of connected mode wireless communication devices (connected mode UEs) reveals that there are not enough connected mode wireless communication devices that will receive a PTM compatible service to justify providing the service via PTM (MBMS), the MBMS system 100 performs an idle mode counting procedure to determine if the total number of connected and idle mode wireless communication devices interested in a PTM compatible service justifies providing the PTM compatible service using PTM (MBMS). For the examples herein, the idle mode counting procedure is performed only when the connected mode counting procedure indicates that there are not enough connected mode wireless communication devices that have indicated that they will receive the PTM compatible service to justify providing the content using PTM.

The MCE 114, therefore, invokes the connected mode counting procedure in accordance with a 3GPP specification to determine if one or more PTM compatible services should be provided using PTM. Accordingly, the MCE 114 determines if a particular PTM compatible service should be established through MBSFN or, if already established, whether the PTM compatible service should continue to be provided through MBSFN. Therefore, an example of the connected mode counting procedure (CM counting procedure) includes the 3GPP LTE Communication Specification Counting Procedure described in a 3GPP LTE Communication Specification such as TS 36.331 v10.2.0 and TS 36.300 v10.3.0 which are incorporated by reference herein. The CM Counting Procedure is initiated by the MCE 114. The MCE 114 directs each eNodeB providing the service in the MBSFN area to send a Connected Mode Counting Request (CM Counting Request) 118 to the UEs. For the example, the CM Counting Request 118 contains a list of PTM compatible services requiring UE feedback. The connected mode UEs 106, 108 which are receiving or interested in the indentified PTM compatible service respond with a Connected Mode Counting Request Response (CMCRR) message 120 including the MBMS service identifiers of interest. The MCE 114 evaluates the responses 120 and determines the number of connected mode UEs that are using or expected to use each PTM service (e.g., the UEs that are receiving or are likely to receive the specific PTM compatible service). A Wireless communication device (UE) indicates interest in a PTM compatible service with the CMCRR message 120. Accordingly, CMCRR message 120 indicates to the system 100 that the UE sending the CMCRR message 120 should be counted for the PTM compatible service at least for purposes of resource management. The number of connected mode UEs for each PTM compatible service (MBMS service) is compared to a threshold and, if the number is above the threshold, the MCE 114 determines that the particular PTM compatible service should be provided via PTM. If, however, the number of connected mode UEs is below the threshold, the MCE executes an idle mode (IM) Counting Procedure.

For the examples herein, the IM Counting Procedure includes transmitting a downlink message 122 that can be received by UEs in idle mode (IMUEs) 102, 104 where the downlink message 122 includes a service identifier 124 that identifies at least one PTM compatible service such a TV show, movie, concert, or the like. The service identifier 124 may, therefore, include all PTM compatible services evaluated in the CM counting procedure or may include only a subset. The downlink message 122 is transmitted by all of the base stations (eNodeBs) in the MBSFN area. The downlink message 122 is an Idle Mode Counting Request (IMCR) message 126 that is sent as part of a MBMS control message. Examples of suitable MBMS control messages include messages such as a System Information Block (SIB) message or a MBMS point-to-multipoint Control Channel (MCCH) message. For the example, the IMCR is sent as an Information Element (IE) in a SIB 13 message. The IMCR message 126 includes a service identifier (SI) 124 that identifies at least one PTM compatible service. The service identifier 124 may be a list of PTM compatible services in many circumstances. The IM UEs 102, 104 receive and process the downlink message (IMCR message) and respond with an idle mode (IM) Counting Request Response message (IMCRR message) 130. The IMCRR message 130 is sent as an uplink message 132 in response to the IMCR message and contains a service identifier (SI) 134 that identifies at least one PTM compatible service for the discussed example. The identified PTM compatible service indicates that the UE should be counted as a device that is, or will be, using the PTM compatible service. Accordingly, the IMCRR message 130 indicates that the wireless communication device sending the message should be counted for the PTM compatible service at least for purposes of resource management. In order to transmit the IMCRR message, a UE in idle mode must transition to the connected mode. For the examples, the IMCRR message is the same as a CMCRR message except that the IMCRR message is sent from an UE that was in the idle mode when an IMCR message was sent. In other words, the formats of the two messages are the same for at least one example.

In some circumstances, a mechanism may be used to minimize double counting UEs that are in connected mode that receive the IMCR. One technique, for example, may use an IMCR message 124 that includes an instruction that requires the UE to respond to the CMCR after entering the connected mode. In accordance with 3GPP specifications, a UE in connected mode only responds to a Counting Request occurring after a change in MCCH information. Therefore, the UE does not respond to multiple Counting Requests avoiding multiple counting of the UE while in the connected mode. Accordingly, if the IMCR includes an instruction to respond to the latest Counting Request, only UEs in idle mode that switched to connected mode will respond to the Counting Request. UEs in connected mode receiving the IMCR will not respond since the MCCH information has not changed and the counting request received via the SIB 13 message is the same as the latest connected mode counting request.

The system 100, therefore, receives idle mode response messages transmitted by wireless communication devices that were in the idle mode at the time the downlink message was sent where each idle mode counting request response message indicates that the communication device sending the idle mode counting request response message should be counted for the PTM compatible service. The counting request response message, therefore, indicates that the device sending the message should be counted as an MBMS device that will use the MBMS service. In the interest of minimizing wireless communication traffic, therefore, response messages are only sent to indicate an interest in the service for the example. In some circumstances, however, a response message may include an indication that the device is not interested in a particular service.

Figure 2:
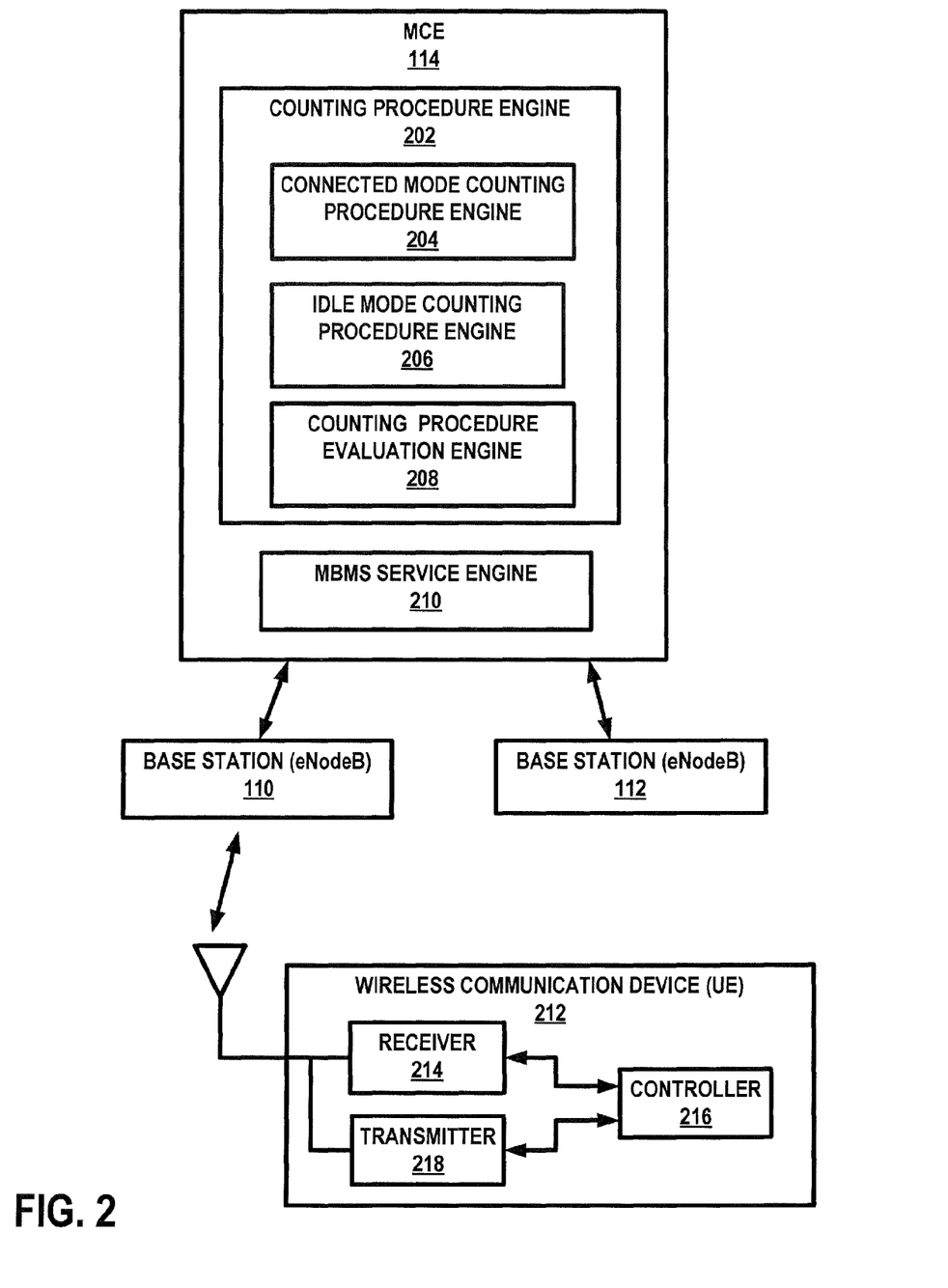
FIG. 2 is block diagram of an example of the MBMS system where the MCE includes a Counting Procedure engine having a Connected Mode Counting Procedure engine and idle mode Counting Procedure engine.

FIG. 2 is block diagram of an example of the MBMS system 100 where the MCE 114 includes a counting procedure engine 202 having a connected mode counting procedure engine 204 and an idle mode counting procedure engine 206. As explained above, the MCE 114 is typically a logical entity where the components forming the MCE 114 are distributed over two or more network elements although the MCE 114 can be implemented within a single device. The entities performing functions of the MCE 114 can be described as engines where an engine includes hardware and code that performs computations, exchanges signals, executes procedures and generally operates to perform a function or set of functions. Accordingly, the discussed engines may be implemented using any combination of hardware, software, and/or firmware that may be distributed over several devices or implemented within a single device. Further, portions of the engines may be shared with other engines and/or other elements such that hardware and/or code used by one engine may be employed by one or more other engines or other devices.

For the example, a counting procedure engine 202 in the MCE 114 includes a connected mode counting procedure engine 204, an idle mode counting procedure engine 206, and a counting procedure evaluation engine 208. The counting procedure engine 202 executes tasks resulting in the exchange of signals and messages between the base stations 110, 112 and the wireless communication devices and the execution of calculations to determine a number of wireless communication devices likely to access a specific PTM compatible service capable of being transmitted using PTM. Therefore, the counting procedure engine 202 counts responses from wireless communication devices and determines if the number of devices meeting some criteria justifies providing a specific PTM compatible service using PTM. The connected mode counting procedure engine 204 counts the wireless communication devices (UEs) 106, 108 in connected mode that will access the PTM compatible service (specific MBMS content) and the idle mode counting procedure engine 296 counts the wireless communication devices (UEs) 102, 104 in idle mode that will access the PTM compatible service). Among other functions, the counting procedure evaluation engine 208 determines, based on the results of the connected mode counting procedure engine 204, whether the idle mode counting procedure engine 206 should be invoked. If the counting procedure evaluation engine 208 determines that there is a sufficient number of wireless communication devices in connected mode that are likely to receive the content, the idle mode counting procedure engine 296 is not invoked for the PTM compatible service and the PTM compatible service is provided using PTM. If, however, the counting procedure evaluation engine 208 determines that there is not a sufficient number of wireless communication devices in connected mode that are likely to receive the content, the idle mode counting procedure engine 206 is invoked and the PTM compatible service is provided using PTM only if the total number of wireless communication devices in connected mode and in idle mode that will use the service justifies providing the PTM compatible service using PTM.

The wireless communication device 212 is an example of a wireless communication device capable of receiving PTM (MBMS) and that is operable in one of at least two modes including the connected mode and the idle mode where a wireless communication device is in the connected mode when an RRC Connection has been established and is in the idle mode when no RRC Connection has been established. Accordingly, depending on the state of the wireless communication device 212, the wireless communication device 212 is an example of the connected mode wireless communication devices 106, 108 and the idle mode wireless communication devices 102, 104.

The wireless communication device (UE) 212 includes a receiver 214, a transmitter and a controller 216. The receiver 214 is configured to receive downlink signals transmitted from one or more base stations (eNodeBs). The signals that can be received by the receiver 214 at least partially depend on the mode of the wireless communication device (UE) 212. In the connected mode, the wireless communication device 212 monitors control channels to obtain timing and channel information allowing the receiver to receive downlink signals. In the idle mode, however, the wireless communication device is not able to receive the all of the same downlink signals that can be received in the connected mode. Accordingly, there are only some downlink signals that can be received by the receiver in idle mode. In 3GPP LTE systems, the downlink signals that can be received in idle mode include at least synchronization signals, paging signal and system information signal and MBMS signal. When the wireless communication device 212 is in the connected mode, the transmitter 218 transmits uplink signals in accordance with the communication standard and the control information. The transmitter 212 does not transmit uplink signals when the wireless communication device 22 is in the idle mode. Accordingly, if the wireless communication device 212 is in the idle mode, the wireless communication device 212 must switch to the connected mode in order for the transmitter to transmit an uplink signal.

Among other functions, the controller 218 determines when to switch between modes and executes the procedures to switch between modes. The controller 218 is any processor, processor arrangement, logic circuitry, circuit, arrangement of electronics, code, or combination thereof that performs the described functions as well as facilitating the overall operability of the wireless communication device 212.

The connected mode counting procedure engine 204 instructs the base stations to send a connected mode counting request (CMCR) 118 to the wireless communication devices 102, 104 in connected mode. For the example, the CMCR 118 is sent in accordance with 3GPP communication standards and is therefore sent over the MBMS Point-to-Multipoint Control Channel (MCCH). Since idle mode wireless communication devices cannot respond to the CMCR 118, the idle mode wireless communication devices either ignore or do not read the CMCR portion of the MCCH apportioned for the CMCR. Since the CMCR 118 is sent via a channel that is not monitored by wireless communication devices in idle mode, the CMCR 118 is not received by wireless communication devices 106, 108 in idle mode. The receiver 214 in each connected mode wireless communication device 102, 104 receives the MCCH and deciphers the CMCR 118. The controller 216 processes the CMCR 118 and generates the appropriate CMCRR 120 which is transmitted by the transmitter 218 to a base station (eNodeB). As discussed above, the CMCRR 120 identifies the PTM compatible service which is likely to be received by the wireless communication device. The identified PTM compatible service may include content or services that is currently being received by the wireless communication device or that may be received by the wireless communication device in the future. Therefore, the controller 216 may determine that the user is interested in a particular content, such as service, TV show, movie, audio broadcast, etc., based on the determination that the PTM compatible service is currently being received, PTM compatible service is scheduled to be received, or by some other indication such as by a user input, for example. Accordingly, the CMCRR 120 indicates that the device sending the message should be counted for the PTM compatible service.

In accordance with current 3GPP specifications, the CMCRR 120 includes a list of the particular PTM compatible service that the wireless communication device is likely to receive (PTM compatible services in which the user is interested). In the example, if the controller 216 determines that none of the PTM compatible services listed in the CMCR 118 is of interest to the user and will likely not be received by the wireless communication device, the controller 216 determines that the CMCR 118 should be ignored and no response is sent. In some circumstances, a response can be sent indicating there is not an interest in one or more services. As discussed above, such a technique is typically avoided in order to minimize wireless communication traffic.

The MCE 114 processes the data provided by the CMCRR messages 120 received by all of the base stations (eNodeBs) 110, 112 in the MBSFN area 116 and determines which PTM compatible service should be transmitted using PTM. The connected mode counting procedure engine 204 calculates the total number of responses indicating interest for each PTM compatible service. The counting procedure evaluation engine 208 determines if the number of devices interested in each PTM compatible service is sufficiently large to justify providing the PTM compatible service by PTM. For the examples herein, the number of counted devices for each PTM compatible service is compared to a threshold and, if the number exceeds the threshold, it is determined that the PTM compatible service should be provided by PTM. The threshold for each service may the same or may be different. Further, the thresholds may be dynamic or static. If the number of counted wireless communication devices that will receive a PTM compatible service does not justify providing the service with PTM, the idle mode counting procedure is invoked by the idle mode counting procedure engine 206.

The idle mode counting procedure engine 206 requests or otherwise instructs the base stations (eNodeBs) in the area to transmit an idle mode counting request (IMCR) 126 using a downlink signal that can be received wireless communication devices 102, 104 (UEs) in idle mode. As discussed above, examples of suitable techniques for transmitting the IMCR 126 include using a System Information Block (SIB) message or a MBMS point-to-multipoint Control Channel (MCCH) message. The IMCR 126 includes a service identifier 124 that identifies one or more PTM compatible services for which the MCE 114 is performing the idle mode counting procedure. The list of PTM compatible services includes each PTM compatible service (MBMS service) for which the connected mode counting procedure determined that there was an insufficient number of connected mode devices that would use the service. Accordingly, the list of services in the IMCR service identifier 124 may be the same as or may be a subset of the list of services transmitted in the CMCR 118.

Since the IMCR 126 is transmitted using a downlink signal 122 that can be received by a wireless communication device 104, 106 in idle mode, the IMCR 126 is received by the receiver 214 and processed by the controller 216 in each wireless communication device in idle mode within the MBSFN area 116. In response to the IMCR 126, the controller 216 generates an IMCRR 130 identifying the MBMS services in the IMCR 126 that the wireless communication device 106, 108 is likely to receive. Accordingly, the service identifier 134 in the IMCRR 130 includes a list of MBMS services that are of interest to the user. The MBMS services may be services that are currently being received by the wireless communication device or may be services that are determined by the controller 216 to be PTM compatible services that the wireless communication device will receive in the future. If the controller 216 identifies at least one PTM compatible service that should counted, the controller 216 switches the wireless communication device 212 (104, 106) from the idle mode to the connected mode. Once in the connected mode, the transmitter 218 transmits the IMCRR 130 to the base station 110.

The MCE 114 processes the data provided by the IMCRR messages 130 received by all of the base stations 110, 112 in the MBSFN area and determines which PTM compatible services should be transmitted using PTM. The idle mode counting procedure engine 206 calculates the total number of responses indicating interest for each PTM compatible service. The counting procedure evaluation engine 208 determines if the total number of wireless communication devices interested in each PTM compatible service is sufficiently large to justify providing the PTM compatible service by PTM. The counting procedure evaluation engine 208, therefore, adds the number wireless communication devices counted for a PTM compatible service by the connected mode counting procedure engine 204 to the number of wireless communication devices counted for the PTM compatible service by the idle mode counting procedure engine 206 to calculate a total number of wireless communication devices for each PTM compatible service. For the examples herein, the total number of counted devices for each PTM compatible service is compared to a threshold and, if the number exceeds the threshold, it is determined that the PTM compatible service should be provided by PTM. The thresholds may be the same or different for each PTM compatible service. Further, the thresholds may be dynamic or static. In accordance with known techniques, the MBMS service engine 210 provides the PTM compatible services using PTM for all PTM compatible services determined to have a sufficiently high number wireless communication devices as counted by the counting procedure engine 202.

Figure 3:
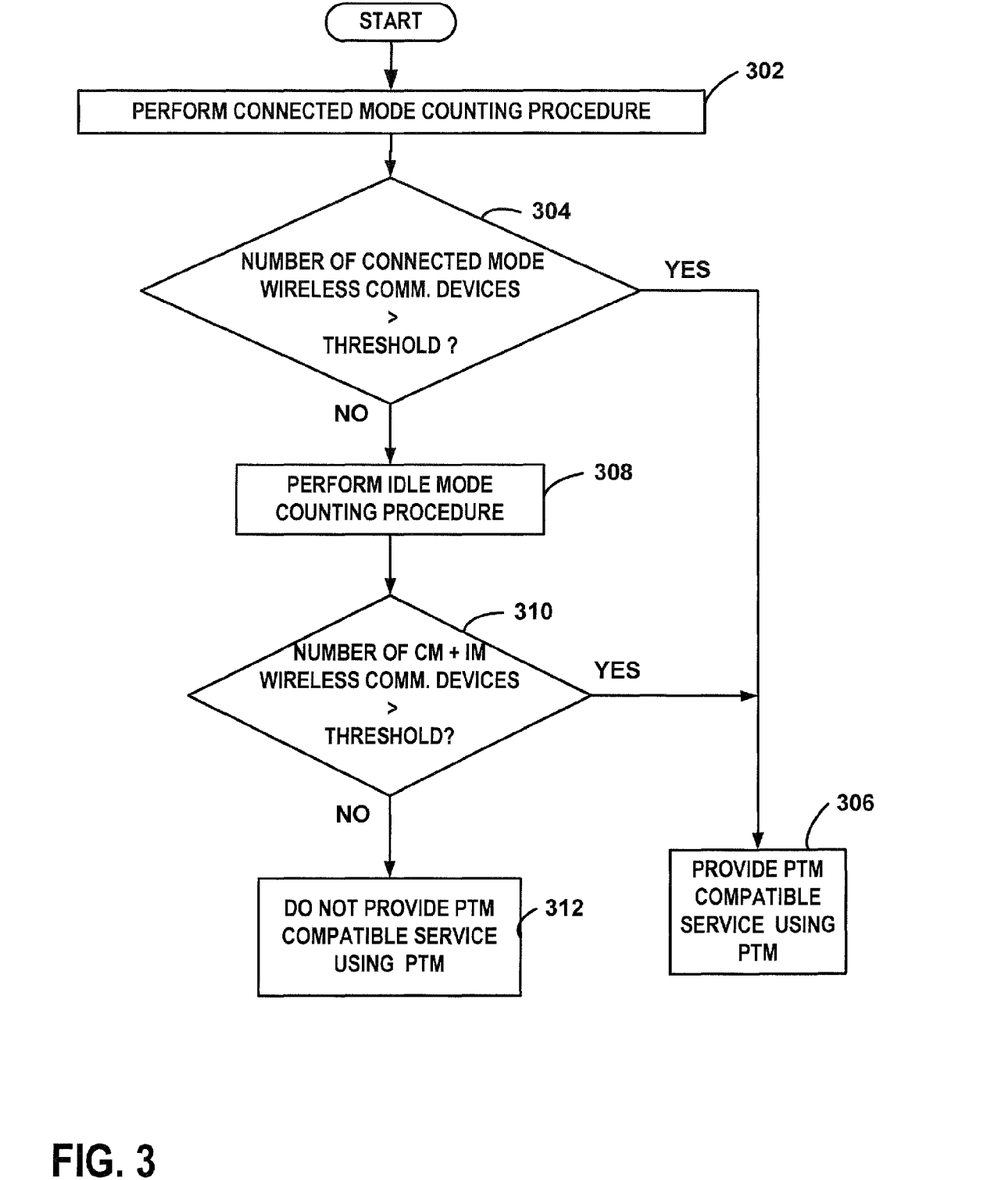
FIG. 3 is flow chart of method of performing a counting procedure.

FIG. 3 is flow chart of method of performing a counting procedure. Although the method may be performed using any combination of hardware and code, for the example of FIG. 3, the method is performed in a communication system 100 of FIG. 1 and FIG. 2 described above.

At step 302, the connected mode counting procedure is performed. As discussed above, the MCE 114 invokes the counting procedure by requesting the base stations (eNodBs) 110, 112 in the MBSFN area 116 to send connected mode counting requests (CMCR) 118. CMCRs 118 identify at least one PTM compatible service for which a count is desired. Since the connected mode counting requests 118 is only used by connected mode wireless communication devices (CMUEs), only the connected mode wireless communication devices UEs respond with a connected mode counting request response (CMCRR) 120 which indicates which PTM compatible services the wireless communication device (UE) is receiving or intends to receive. In other words the CMCRR 120 identifies the PTM compatible services for which the wireless communication device (UE) should be counted.

At step 304, it is determined whether the number of connected mode wireless communication device (CMUE) that will receive a PTM compatible service is greater than a threshold. If the number of connected mode wireless communication devices (CMUEs) is greater than a threshold for a PTM compatible service, the method proceeds to step 306, where the PTM compatible service is provided using PTM. Otherwise, the method continues at step 308.

At step 308, the idle mode counting procedure is performed. As discussed above, an idle mode counting request (IMCR) is transmitted from the base stations (eNodeBs) using downlink signals that can be received by UEs in idle mode. Each UE in idle mode receives the IMCR and respond with an IMCRR indicating which PTM compatible service will be received by then UE. Each idle mode wireless communication device (IMUE) that generates a response, switches to the connected mode and transmits the IMCRR 130. For the example, a UE does not respond if there are no PTM compatible services of interest to the user. The IMCRRs are received by the base stations (eNodeBs) and forwarded to the MCE 114 where the number of UEs for each PTM compatible service is calculated.

At step 310, for each PTM compatible service, the total number wireless communication devices that will likely receive the PTM compatible service is compared to a threshold. The total number of wireless communication devices is calculated by summing the number of idle mode wireless communication devices with the number of connected mode wireless communication devices. In some circumstances, techniques may be implemented to avoid double counting wireless communication devices that are in the connected mode but also receive the IMCR. If the total number exceeds the threshold, the method continues proceeds to step 206. Otherwise, the method continues at step 312 where the PTM compatible services not having an adequate number of interested wireless communication devices are not transmitted using PTM. The PTM compatible service may be transmitted using Unicast service (PTP) to each wireless communication device interested in the particular PTM compatible service. For example, if the user still desires the service if it is not available via PTM, the wireless communication device can employ a Unicast connection to obtain the service.

Figure 4:
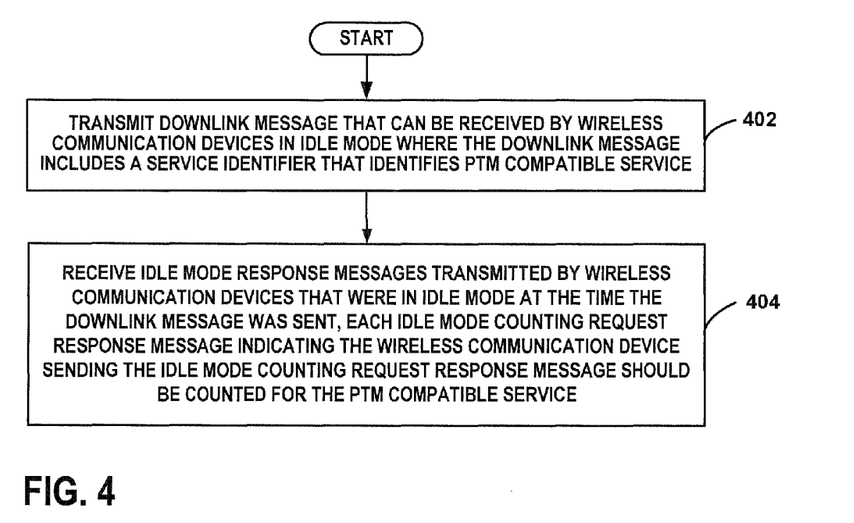
FIG. 4 is a flow chart of an example of a method of performing an idle mode counting procedure performed by the communication system.

FIG. 4 is a flow chart of an example of a method of performing an idle mode counting procedure performed by the communication system. For the example of FIG. 4, the method is performed by the MCE, the base stations, and other system components at the direction of the MCE.

At step 402, downlink messages that can be received by wireless communication devices in idle mode are transmitted where the downlink messages include at least a service identifier that identifies a PTM compatible service for which idle mode wireless communication devices are to be counted. For the example, an IMCR is transmitted from the base stations. As discussed above, a suitable technique for transmitting the IMCR includes transmitting an information element (IE) within an SIB 13 message.

At step 404, responses to the IMCR are received from wireless communication devices that were in the idle mode at the time the IMCR was sent. Each wireless communication device responding to the idle mode counting request, switches to connected mode and transmits an idle mode counting request response message that indicates that the wireless communication devices sending the response should be counted for at least one PTM compatible service identified in the IMCR.

Therefore, the system 100 sends an IMCR including a service identifier identifying at least one PTM compatible service to be counted. In response to the IMCR, each wireless communication device in idle mode indicates an interest in one or more PTM compatible services identified in the IMCR by sending an IMCRR including a service identifier identifying the services of interest.

Figure 5:
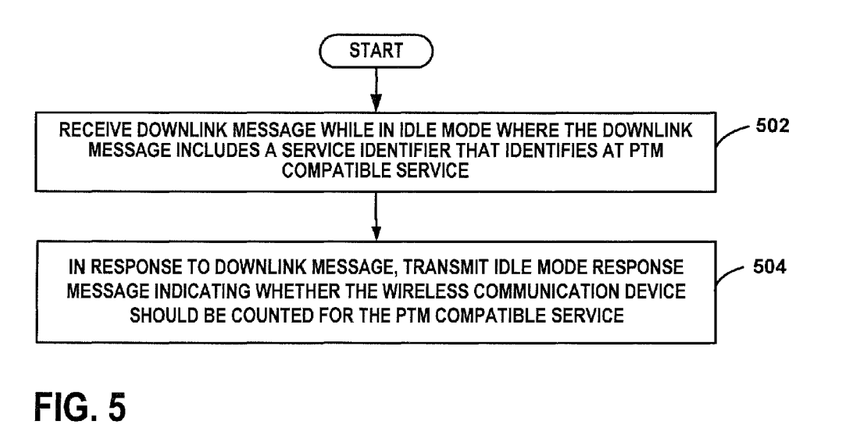
FIG. 5 is a flow chart of an example of a method of counting procedure performed at an idle mode wireless communication device.

FIG. 5 is a flow chart of an example of a method of counting procedure performed at an idle mode wireless communication device. For the example, the method is performed in a wireless communication device such as the wireless communication device 212. The method begins with the wireless communication device in the idle mode. Accordingly, the wireless communication device 212 is an idle mode wireless communication device 102, 104 at step 502.

At step 502, a downlink request message is received at the wireless communication device while the wireless communication device is in idle mode. The downlink message includes a service identifier that identifies at least on PTM compatible service. For the example, the wireless communication device 212 (102,104) receives an IMCR transmitted from a base station. An example of a downlink request message, therefore, is an IMCR.

At step 504, an idle mode response message is transmitted in response to the downlink request message. The idle mode response message indicates whether the wireless communication device should be counted as a device that will receive the PTM compatible service identified in the downlink request message. For the example, the response message is an IMCRR. As explained above, the IMCR may include a list of PTM compatible services for which a count is being obtained. The IMCRR may include a list of PTM compatible services that is subset of, or the same as the list in the IMCR. In order to transmit the idle mode response message, the wireless communication device 212 must first switch to the connected mode.

Figure 6:
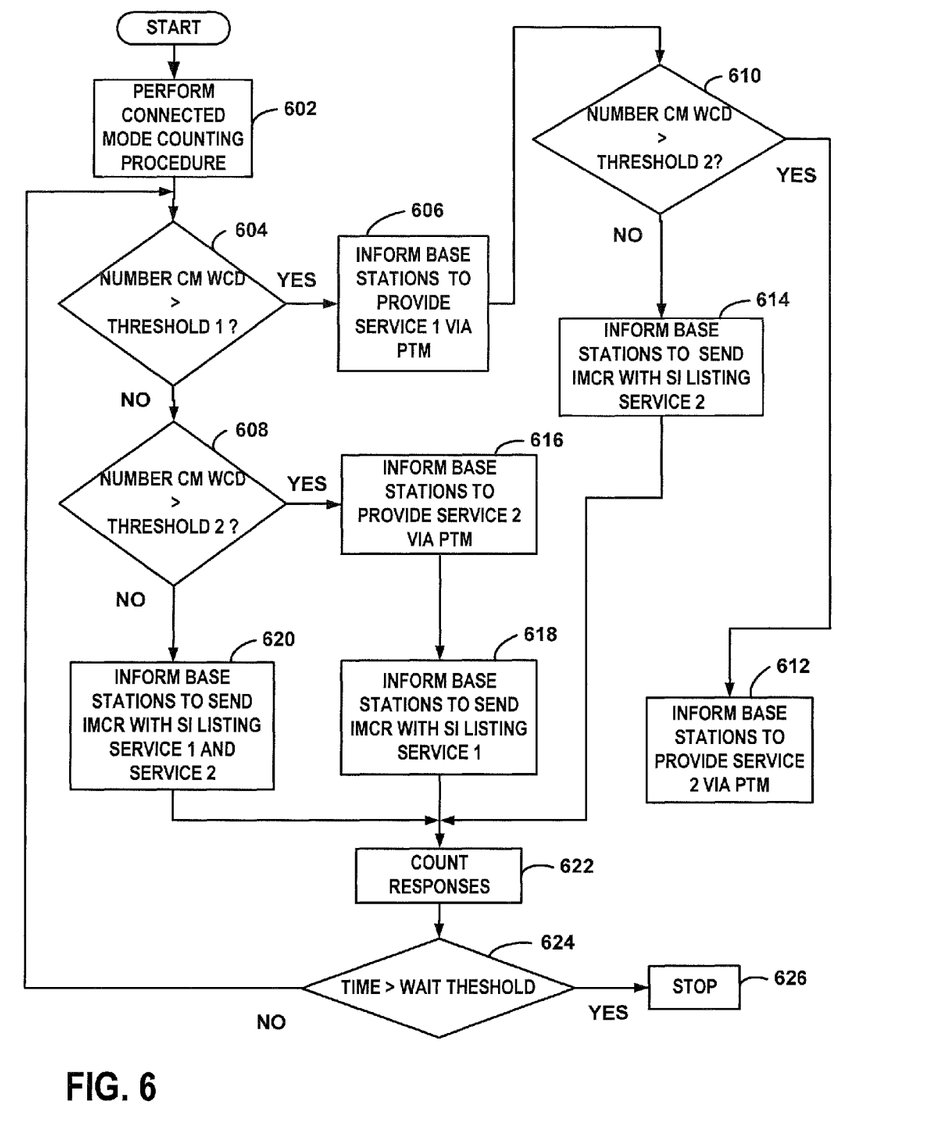
FIG. 6 is a flow chart of a method of managing two PTM compatible services.

FIG. 6 is a flow chart of a method of managing two PTM compatible services. The method is an example of the method discussed with reference to FIG. 3. Although the method may be performed by other entities, the method is performed by the MCE for the example.

At step 602, the connected mode counting procedure is performed. The MCE directs the base stations (ENodeBs within the MBSFN area to send a Counting Request for a first PTM compatible service (service 1) and a second PTM compatible service (service 2). The wireless communication devices (UEs) in connected mode respond to the request. The Counting Request is a Connected Mode Counting Request (CMCR) and the responses are Connected Mode Counting Request Responses (CMCRRs). For each service, the number of responses indicating that the responding wireless communication device will receive the PTM compatible service is determined.

At step 604, the number of wireless communication devices in connected mode that have indicated an interest in the first PTM compatible service is compared to a first service threshold. If the number is greater than the threshold, the method continues to step 606. Otherwise, the method proceeds to step 608.

At step 606 the MCE informs the base stations to provide the first PTM compatible service (Service 1) using MBMS. The method proceeds to step 610 where the number of wireless communication devices in connected mode that have indicated an interest in the second PTM compatible service is compared to a second service threshold. If the number is greater than the threshold, the method continues to step 612 where the base stations are informed to provide the second PTM compatible service using PTM. Otherwise, the method proceeds to step 614.

At step 614, the base stations are instructed to send a counting request to the wireless communication devices in idle mode. An IMCR is sent by the base stations over downlink signals that can be received by the idle mode wireless communication devices (IM UEs). A service identifier within the IMCR identifies the second PTM compatible service. As discussed above, an example of a suitable technique for sending the IMCR includes sending an information element (IE) within a SIB 13 message.

At step 608, the number of wireless communication devices in connected mode that have indicated an interest in the second PTM compatible service is compared to the second service threshold. If the number is greater than the threshold, the method continues to step 616. Otherwise, the method proceeds to step 620.

At step 616 the MCE informs the base stations to provide the second PTM compatible service (service 2) using PTM. The method proceeds to step 618 where the base stations are instructed to send a counting request to the wireless communication devices in idle mode. An IMCR is sent by the base stations over downlink signals that can be received by the idle mode wireless communication devices (IM UEs). A service identifier within the IMCR identifies the first PTM compatible service.

At step 620, the base stations are instructed to send a counting request to the wireless communication devices in idle mode. An IMCR is sent by the base stations over downlink signals that can be received by the idle mode wireless communication devices (IM UEs). A service identifier within the IMCR identifies the first PTM compatible service and the second PTM compatible service.

After either step 614, 618, or 620 is performed, the method proceeds to step 622. At step 622, the responses received from the wireless communication devices are counted. The IMCRRs include a service identifier identifying one or more PTM compatible services. Depending on service identifiers in the IMCR and the response of the particular wireless communication device, the service identifier in an IMCRR may identify service 1, service 2 or both. For example, if step 620 is performed so that the IMCR lists both service but a particular wireless communication device is only interested in receiving service 2, the service identifier in the IMCRR only lists service 2. As discussed above, techniques may be used in some circumstances to avoid double counting a wireless communication device that sends a counting request response in response to a counting request received while in connected mode and a response in response to a counting request received while the idle mode.

At step 624, it is determined if the elapsed time since the first IMCR message was sent has reached a threshold. In some circumstances, the elapsed time may be based on a number of times the IMCR message is sent. If the time meets the threshold, the method stops at step 626. Otherwise, the method returns to step 604.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method of counting idle mode wireless communication devices in a 3rd Generation Partnership Project (3GPP) Long Term Evolution (LTE) communication system providing Multimedia Broadcast Multicast Service (MBMS) service, the system comprising a plurality of wireless communication devices, each wireless communication device capable of being in one of at least two modes comprising a connected mode and an idle mode where a wireless communication device is in the connected mode when a Radio Resource Control (RRC) Connection has been established and is in the idle mode when no RRC has been established, the method comprising:

sending an idle mode downlink message comprising an idle mode counting request identifying a Point-to-Multipoint (PTM) compatible service, the idle mode downlink message being one of a System Information Block (SIB) message and a MBMS point-to-multipoint Control Channel (MCCH) message;

receiving idle mode counting request response messages transmitted by communication devices that were in the idle mode at the time the downlink message was sent, each idle mode counting request response message indicating the communication device sending the idle mode counting request response message should be counted for the PTM compatible service; and prior to sending the idle mode downlink message, executing a connected mode counting procedure to determine whether a number of wireless communication devices in a connected mode indicating that they should be counted for the PTM compatible service is greater than a connected mode threshold, wherein sending the idle mode downlink message is executed only if the number of wireless communication devices in the connected mode indicating that they should be counted for the PTM compatible service is not larger than the connected mode threshold.

2. The method of claim 1, further comprising:

adding the number of wireless communication devices in connected mode indicating that they should be counted for the PTM compatible service to the number of wireless communication devices in idle mode indicating that they should be counted for the PTM compatible service to determine a total number of wireless communication devices indicating that they should be counted for the PTM compatible service; and using MBMS to provide the PTM compatible service only if the total number of wireless communication devices that they should be counted for the PTM compatible service is greater than the threshold.

3. The method of claim 2, further comprising:

using Unicast point-to-point service to provide the PTM compatible service when the total number of wireless communication devices that they should be counted for the PTM compatible service is not greater than the threshold.

4. The method of claim 2, wherein the idle mode counting request indicates a plurality of PTM compatible services and wherein each idle mode counting request response message indicates the communication device sending the idle mode counting request response message should be counted for receiving at least one of plurality of PTM compatible services.

5. A Multimedia Broadcast Multicast Service (MBMS) system operating accordance with a 3rd Generation Partnership Project (3GPP) Long Term Evolution (LTE) communication system providing Multimedia Broadcast Multicast Service (MBMS) service, the MBMS system comprising:

a plurality of wireless communication devices, each wireless communication device operable in one of at least two modes comprising a connected mode and an idle mode where a wireless communication device is in the connected mode when a Radio Resource Control (RRC) Connection has been established and is in the idle mode when no RRC Connection has been established; and a Multi-cell/multicast Coordination Entity (MCE) comprising:

a connected mode counting procedure engine configured to execute a connected mode counting procedure to determine whether a number of wireless communication devices in a connected mode counted for receiving a Point-to-Multipoint (PTM) compatible service is greater than a threshold;

an idle mode counting procedure engine configured to execute an idle mode counting procedure only if the number of wireless communication devices in connected mode counted for the PTM compatible service is not larger than the threshold, the idle mode counting procedure comprising:

sending an idle mode downlink message comprising an idle mode counting request identifying the PTM compatible service, the idle mode downlink message being one of a System Information Block (SIB) message and a MBMS point-to-multipoint Control Channel (MCCH) message;

receiving idle mode response messages transmitted by wireless communication devices that were in the idle mode at the time the idle mode downlink message was sent, each idle mode counting request response message indicating the wireless communication device sending the idle mode counting request response message should be counted for the PTM compatible service.

6. The MBMS system of claim 5, wherein the MCE further comprises:

a counting procedure evaluation engine configured to add the number of wireless communication devices in connected mode indicating they should be counted for the PTM compatible service to the number of wireless communication devices in idle mode indicating that they should be counted for the PTM compatible service to determine a total number of wireless communication devices indicating that they should be counted for the PTM compatible service; and a MBMS service engine configured to use MBMS to provide the PTM compatible service only if the total number of wireless communication devices indicating that they should be counted for the PTM compatible service is greater than the threshold.

7. The MBMS system of claim 5 wherein the idle mode counting request identifies a plurality of PTM compatible services and wherein the idle mode response messages indicate that the wireless communication device sending the idle mode counting request response message should be counted for at least one of the plurality of PTM compatible services.

* * * * *